(12) United States Patent
Hashino et al.

(10) Patent No.: US 6,213,850 B1
(45) Date of Patent: Apr. 10, 2001

(54) METHOD AND APPARATUS FOR PRODUCING A RAW EDGE BELT

(75) Inventors: Seiji Hashino; Noboru Hasegawa, both of Kobe (JP)

(73) Assignee: Bando Kagaku Kabushiki Kaisha, Kobe (JP)

( * ) Notice: Subject to any disclaimer, the term of this patent is extended or adjusted under 35 U.S.C. 154(b) by 0 days.

(21) Appl. No.: 09/213,609

(22) Filed: Dec. 17, 1998

(30) Foreign Application Priority Data

Dec. 25, 1997 (JP) .................................................. 9-356458

(51) Int. Cl.[7] .................................................. B24B 7/10
(52) U.S. Cl. ............................. 451/188; 451/24; 451/51; 451/188; 451/194; 451/541
(58) Field of Search .............................. 451/11, 24, 194, 451/540, 541, 51, 57, 58, 397, 188

(56) References Cited

U.S. PATENT DOCUMENTS

| | | | |
|---|---|---|---|
| 3,799,824 | * 3/1974 | Arnao et al. | ........................ 156/139 |
| 3,839,116 | * 10/1974 | Thomas et al. | ...................... 156/138 |
| 3,919,025 | * 11/1975 | Ray | ........................................ 156/141 |
| 4,322,916 | * 4/1982 | Richmond | ............................ 451/188 |
| 4,329,192 | * 5/1982 | White, Jr. et al. | .................... 156/138 |
| 4,534,687 | * 8/1985 | Hetz | ..................................... 409/157 |
| 4,941,294 | * 7/1990 | Nakagaki | ............................ 451/179 |
| 5,214,881 | * 6/1993 | Borchardt | ............................ 451/188 |
| 5,335,456 | * 8/1994 | Mishima | ............................... 451/28 |
| 5,414,963 | * 5/1995 | Watanabe et al. | .................... 451/72 |
| 5,486,133 | * 1/1996 | Russell | ................................ 451/150 |
| 5,549,510 | * 8/1996 | Fukuda et al. | ........................ 451/51 |
| 5,595,533 | * 1/1997 | Kumazaki | ............................ 451/541 |
| 5,738,571 | * 4/1998 | Kitahama et al. | ..................... 451/51 |

* cited by examiner

Primary Examiner—David Jones
(74) Attorney, Agent, or Firm—Friedrich Kueffner

(57) ABSTRACT

A method and apparatus is provided for producing raw edge belts. Plural square-cut ring-shaped belts are suspended across a main spindle roller and a tension roller, and while the belts are made to run circularly, the belts are ground into V-section belts to produce raw edge belts. The ring-shaped belts are roughly ground on the main spindle roller section into belts of an almost V-form section by a rough grindstone having V-forms in its peripheral. The roughly-ground ring-shaped belts are thereafter subjected to finish polishing with a finish grindstone.

3 Claims, 4 Drawing Sheets

METHOD AND APPARATUS FOR PRODUCING A RAW EDGE BELT

BACKGROUND OF THE INVENTION

1. Field of the Invention

The present invention relates to a method and apparatus for producing a raw edge belt.

2. Description of the Related Art

A raw edge belt is a ring-shaped power transmission belt a section of which is an inverted trapezoid (or V-form). FIG. 3 is a perspective view of a belt showing a section and part thereof. As shown in FIG. 3, the belt is provided with an upper rubber layer 31, tensile members 32, and a lower rubber layer 33. FIG. 4 shows the production procedure of a belt. The production procedure is 1) to build these constituent materials, in this order, as cylindrical layers, starting from the inner side, then vulcanize the built-up work to form a sleeve (vulcanized sleeve, of which section is shown in FIG. 4 (a)); 2) to slice or section the sleeve into pieces of a desired width (belt width) along the dotted lines x to get ring-shaped belts of which section is rectangular (called square-cut belts and shown in FIG. 4 (b)); and 3) to cut these square-cut belts obliquely along the dotted lines y to get raw edge belts of which section is a V-form (FIG. 4 (c)). The present invention relates to steps for cutting the square-cut belts into belts of a V-form section to get raw edge belts.

For example, examined Japanese Provisional Patent Publication No. HEI 5-28978 discloses "a production method wherein a vulcanized sleeve is put between two spindles, the sleeve is made to run circularly, a group of integrated grinding wheels, comprising a plurality of grindstone discs of which peripheral section is a V-form, is kept rotated and pressed against the peripheral surface of the vulcanized sleeve to cut into it and grind plural V-shaped grooves, and positioning members are fit into the V-grooves to cut the sleeve into individual raw edge V-belts."

Another method for producing a raw edge V-belt is, first, to square-cut (this means slicing or sectioning a sleeve into rings having a rectangular section) a vulcanized sleeve into pieces of a desired belt width, then to grind and polish a belt, one at a time, to change its section into a V-form. As for a production apparatus for grinding a belt into a V-section belt, Japanese Provisional Patent Publication No. HEI 8-164568 discloses a V-section cutting apparatus wherein two milling cutters are arranged so that their cutting edges have angles of inclination for grinding the sides of a belt into a V-section.

The method disclosed by the above-mentioned Japanese Patent Publication No. HEI 5-28978 tends to induce meandering since a wide vulcanized sleeve is made to run circularly over two spindles. Moreover, as many grinding wheels are made to cut into the sleeve concurrently to form V-grooves, the sectional configuration may be distorted by compression, resulting in defective configurations (dents in the inclined sides or displacement). As for the method wherein one square-cut belt is polished into a V-section belt at a time, the productivity is low, resulting in higher cost. As for the milling system with cutters, the life of the cutters is short, posing problems of cutter replacement time and higher cost.

The present invention is intended to solve the above-mentioned quality problems caused by meandering, displacement, etc., and at the same time, to solve the problems of longer working time and higher cost of the method of finishing one square-cut belt at a time.

SUMMARY OF THE INVENTION

A raw edge belt is produced according to the method of the present invention by placing plural square-cut ring-shaped belts across a main spindle roller and a tension roller, running the belts circularly, and polishing the belts to have a substantially V-shaped section. The ring-shaped belts are roughly ground on the main spindle roller by a rough grindstone having V-forms in its peripheral section into belts with a substantially V-shaped section, and in succession, the roughly-ground ring-shaped belts are subjected to finish polishing with a finish grindstone.

The method of the present invention grinds belts with a higher efficiency than a method of grinding one belt at a time, because a plural number of square-cut ring-shaped belts are ground simultaneously. Grinding with a better efficiency is realized by, first, roughly grinding the square-cut ring-shaped belts with a rough grindstone (of which grain size is larger) having V-forms in its peripheral section to change the belts' sections into a substantially V-form. In succession, the roughly-ground ring-shaped belts are subjected to finish polishing with a finish grindstone that is formed similarly to the rough grindstone and has a smaller grain size. In this way, the ring-shaped belts are never subjected to excessive forces, and are free of strains and displacement. As a result, finishing with a higher dimensional accuracy can be accomplished with high efficiency.

In accordance with another aspect of the invention, an apparatus for producing raw edge belts is provided. A main spindle roller is mounted horizontally and designed to hold square-cut ring-shaped belts, a tension roller is located beneath the main spindle roller, being parallel with said main spindle roller and being installed so that it can be raised or lowered, a first rotary grindstone being capable of coming close to or moving away from said main spindle roller and is mounted on the upstream side of the direction of rotation of said main spindle roller, and a second rotary grindstone being capable of coming close to or moving away from said main spindle roller and being mounted on the downstream side of the direction of rotation of said main spindle roller.

As the main spindle roller according to the present invention is mounted horizontally, ring-shaped belts can be easily put on the main spindle roller. When the tension roller, which may be raised or lowered, is raised, ring-shaped belts can be easily put across said main spindle roller and the tension roller or removed from them, and when the tension roller is lowered, a desired tension is given to the ring-shaped belts being held across the rollers to prevent the belts from slipping over the main spindle roller. Moreover, as the tension roller is mounted parallel to the main spindle shaft, the ring-shaped belts will not meander when the belts are made to run circularly.

The first rotary grindstone can be moved close to or away from the main spindle roller. The first rotary grindstone, being rotated, is made to come close to the main spindle roller and contact the ring-shaped belts being put on the main spindle roller and being made to run circularly so as to roughly grind the belts. Replacement of ring-shaped belts is made easier by moving the first rotary grindstone away from the ring-shaped belts. Moreover, the resistance against the ring-shaped belts can be adjusted by adjusting the approaching speed, thus a design wherein ring-shaped belts will not be displaced on the main spindle roller can be made. The second rotary grindstone is mounted on the downstream side of the direction of rotation of the main spindle roller, and with this arrangement, the ring-shaped belts, that have been roughly ground by the first rotary grindstone, can be finish-polished continuously without any replacement. The V-form of the ring-shaped belts that have been substantially formed by the first rotary grindstone is accurately finished into the designed V-form.

In accordance with another aspect of the invention, the tension roller of the apparatus is provided with ribs or flanges for fixing plural ring-shaped belts at the ends thereof. These ribs keep the individual sectioned square-cut belts as one body while these belts are circulated across the main spindle roller and the tension roller, prevent the belts from meandering, and at the same time enable grinding and polishing.

In accordance with another aspect of the invention, the first rotary grindstone is a rough grindstone comprising an assembly of grinding wheels of which peripheral section is a V-form, and the second rotary grindstone is a finish grindstone comprising an assembly of grinding wheels of which peripheral section is a V-form and its grain size is finer than the rough grindstone. In accordance with the present invention, plural square-cut ring-shaped belts can be roughly ground into V-section belts at the same time by an assembly of grinding wheels of which peripheral section is a V-form, and grinding can be done with high efficiency by adjusting the coarseness of the rough grindstone. After rough grinding, the V-form can be finished with high accuracy by means of a finish grindstone of which grain size is finer.

The various features of novelty which characterize the invention are pointed out with particularity in the claims annexed to and forming part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
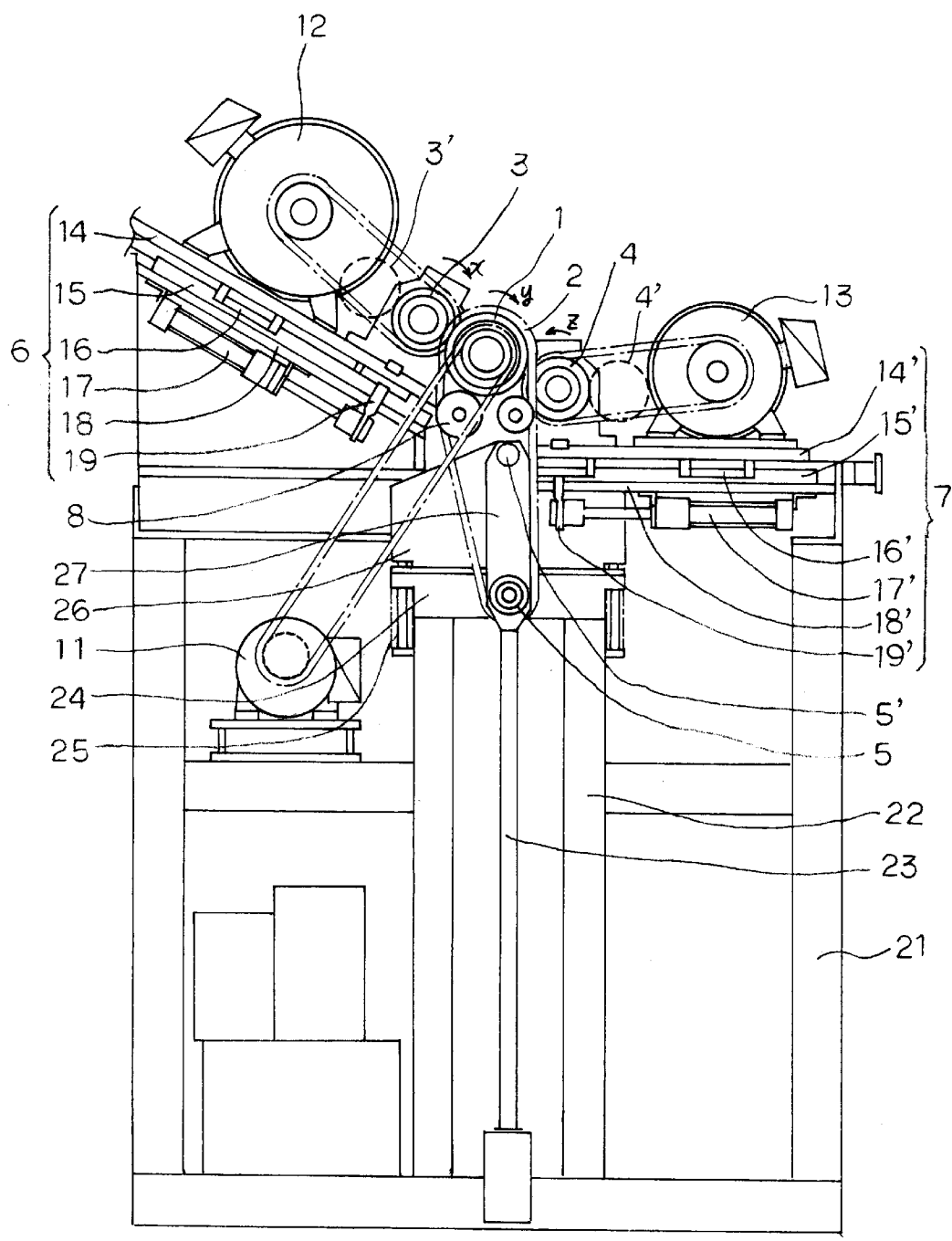
FIG. 1 is a front view (partly omitted) of an embodiment of an apparatus for producing raw edge belts according to the present invention.
Figure 2:
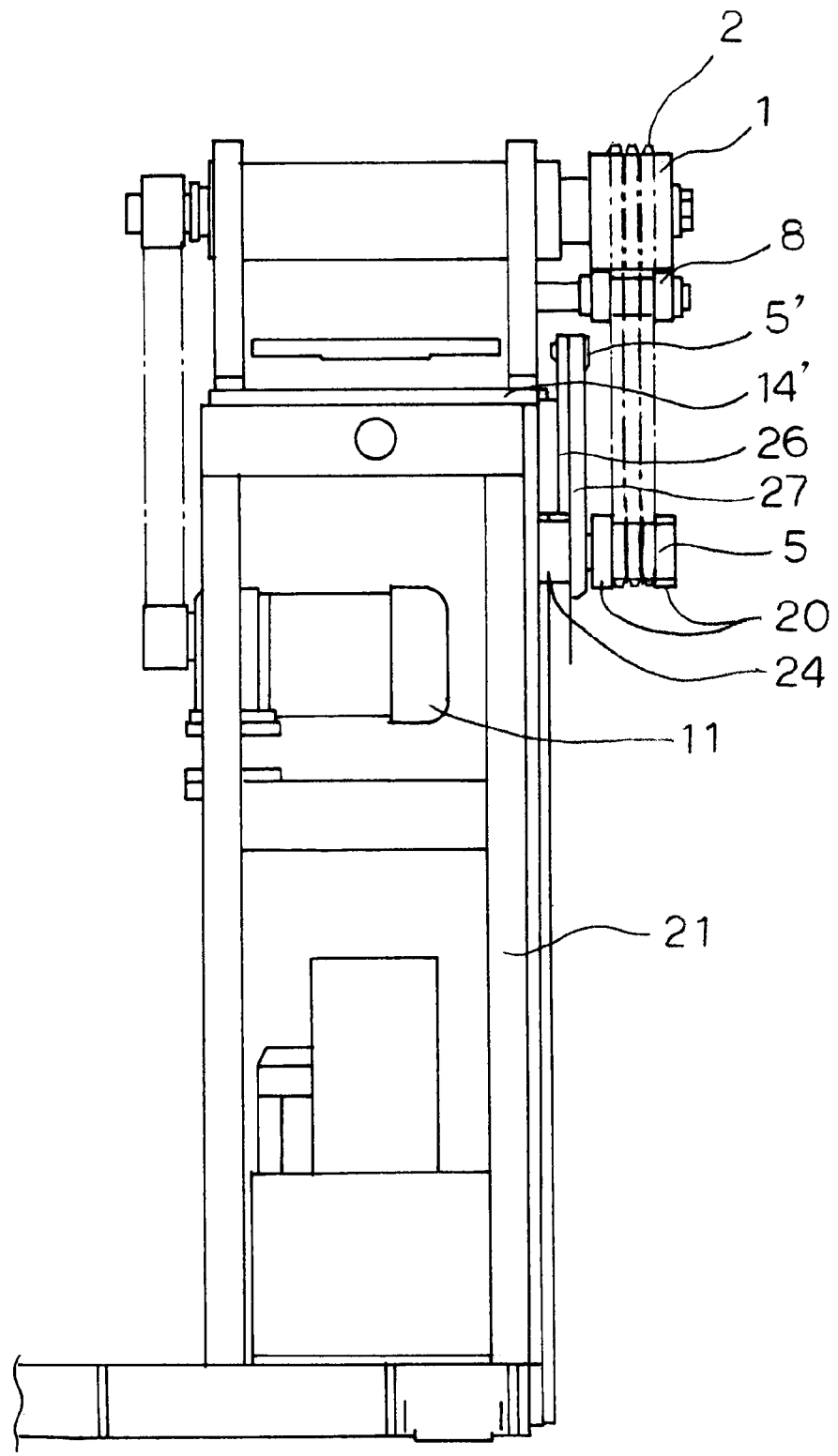
FIG. 2 is a left side view (partly omitted) of the apparatus of FIG. 1.
Figure 3:
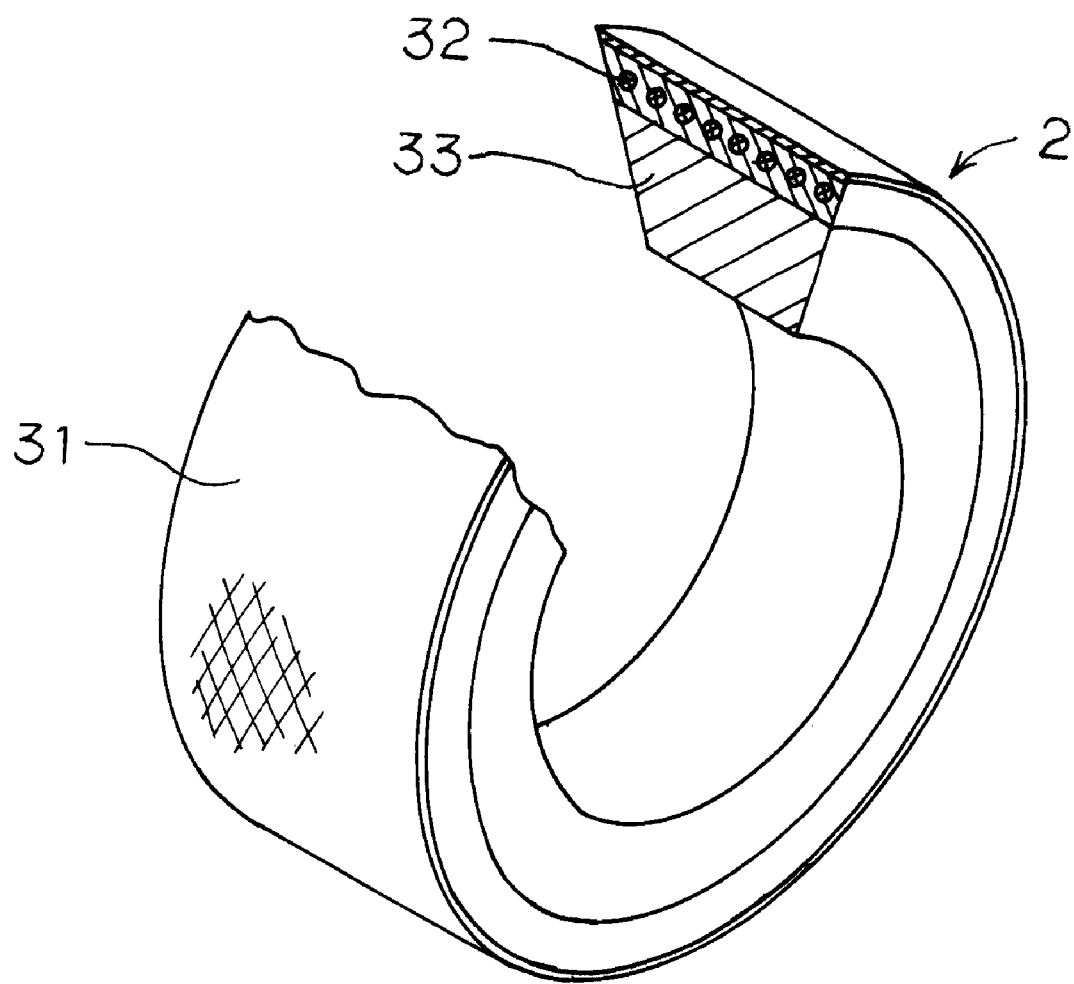
FIG. 3 is a partial perspective view illustrating the construction and appearance of a raw edge belt.
Figure 4:
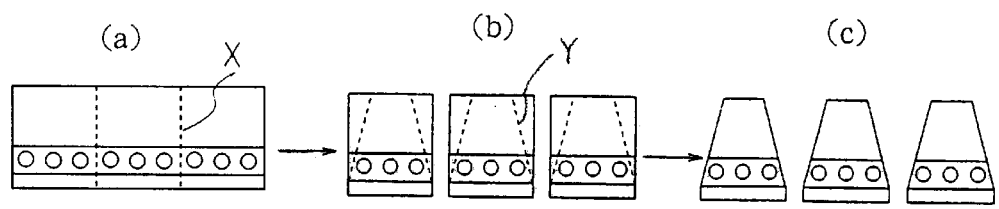
FIGS. 4 (*a*) through (*c*) are conceptual diagrams showing the stages in which a vulcanized sleeve is formed into square-cut belts and then into raw edge belts, in this order.

Referring to the drawings, FIG. 1 is a front view of an embodiment of an apparatus for producing raw edge belts according to the present invention, and FIG. 2 is a left side view of the apparatus of FIG. 1. The production apparatus of this embodiment is provided with, as shown in FIG. 1 and FIG. 2, a main spindle roller 1 being mounted horizontally and designed to hold square-cut ring-shaped belts 2 (in FIG. 2, belts after V-cutting are illustrated for easier recognition), a tension roller 5 is located beneath the main spindle roller 1 and is installed so that it can be raised or lowered, a first rotary grindstone 3 capable of coming close to or moving away from the main spindle roller 1, and a second rotary grindstone 4 capable of coming close to or moving away from the main spindle roller 1 and being mounted on the downstream side of the direction of rotation (arrow y) of the main spindle roller 1.

The square-cut ring-shaped belt 2 is, as described above, a belt having a rectangular section, that has been sliced or sectioned from a vulcanized sleeve. The peripheral surface of the main spindle roller 1 is normally coated with a rubber elastic body to prevent slip between the main spindle roller 1 and ring-shaped belts 1 to be suspended on the roller 1. The main spindle roller 1 is turned by a main spindle motor 11. To further improve the accuracy of the V-form, a metal roller may be used as the main spindle roller 1, and the tension roller 5 may be provided with a turning means and may be provided with an anti-slip cover.

The tension roller 5 is parallel with the main spindle roller 1 and is supported so that it can be raised or lowered. When ring-shaped belts 2 are to be put on the rollers, the tension roller 5 will be raised. When the belts are to be ground and polished, the tension roller 5 is lowered to give a desired tension to the ring-shaped belts 2. This is to prevent the ring-shaped belts 2 from meandering and slipping. The means for raising and lowering the tension roller 5 is shown in FIG. 1. The tension roller 5 is rotatably mounted on auxiliary plate 27 that is mounted on a tension roller support plate 26. The tension roller support plate 26 is supported on a lifting base 24 via a shock absorbing spring 25. The tension given to the ring-shaped belts 2 is adjusted by adjusting the strength of this shock absorbing spring (for example, a coiled spring). The lifting base 24 is supported by a lifting screw 23 and is raised or lowered along a lifting guide 22. The range of lifting is set according to the length of the ring-shaped belts 2 that are to be ground. When the ring-shaped belts 2 are short, the tension roller 5 may be mounted at the top end 5' of the auxiliary plate 27.

Figure 6:
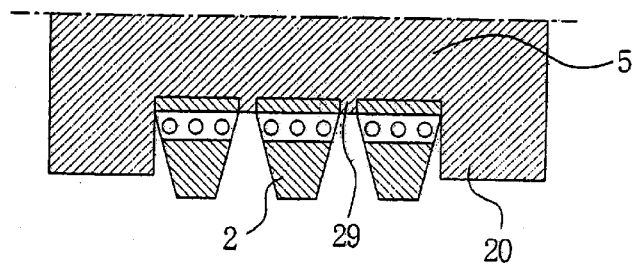
FIG. 6 is a sectional view showing a part of the tension roller and the ring-shaped belts being suspended on the roller.

The tension roller 5 is provided with ribs or flanges 20 (FIG. 2) at its ends, and with a required number of partition rings 29 (FIG. 6) between the ribs 20. The plural sliced square-cut belts 2 are individually guided by the ribs 20 and partition rings 29 on the tension roller 5, and they will not move independently of each other even when they are subjected to grinding; thus they can be ground simultaneously. The state of ring-shaped belts 2 being put on the tension roller 5 is shown in the partial sectional view of FIG. 6. As shown in FIG. 6, ribs 20 are provided at both ends of the tension roller 5, and two partition rings 29 are provided between the ribs 20 (in the present embodiment, three ring-shaped belts 2 are ground simultaneously). A positioning pulley 8 (detail is not illustrated) having ribs corresponding to the tension roller 5 is pressed against the inner sides of the supported ring-shaped belts 2 to prevent the ring-shaped belts 2 from meandering during circular running.

The first rotary grindstone 3 is moved close to or away from the main spindle roller 1 by a first grindstone shifting means 6. The first grindstone shifting means 6 is provided with a first base 14 for supporting the first rotary grindstone 3, a first rail 15 slidably supporting the first base 14 via a first slider 16 and being supported by a first support frame 18, and a first pneumatic cylinder 17 for shifting the first base 14 via a first pin 19, said first pneumatic cylinder 17 being supported by the first support frame 18.

The first rotary grindstone 3 is turned in the direction of the arrow x by a first motor 12. When the first base 14 is moved close to the main spindle roller 1, the first rotary grindstone 3 is made to contact the ring-shaped belts 2 and roughly grind these belts 2 into V-section belts. The grinding efficiency is improved by rotating the first rotary grindstone in a direction opposite to the circular running direction (arrow y) of the ring-shaped belts 2. When the grinding is completed, the first rotary grindstone will be moved away. Next, grinding with the second rotary grindstone (described below) is completed. After that, the ring-shaped belts 2 being suspended will be removed, then belts to be worked next will be suspended.

The second rotary grindstone 4 is turned by a second motor 13 and moved close to or away from the main spindle roller 1 by a second grindstone shifting means 7 having a mechanism similar to that for the first rotary grindstone 3. The approaching position is located on the downstream side of the first rotary grindstone 3, and the second rotary grindstone 4 rotates in the direction of easy flow (direction of the arrow z) of the circular running direction (direction of the arrow y) of the ring-shaped belts 2 to make the finished surface more smooth and accurate. Although not illustrated, a belt retainer is installed in a position on the back side (the inner side of the ring-shaped belts 2) of the contacting point of the second rotary grindstone 4 against the ring-shaped belts 2 to prevent the ring-shaped belts 2 being pressed by the second rotary grindstone 4 from moving away. This is to improve the dimensional accuracy.

In the present embodiment, the first rotary grindstone 3 is a rough grindstone comprising an assembly of plural grinding discs of which peripheral section is a V-form (the number of V-forms in the peripheral section of the grindstone 3 is designed according to the number of ring-shaped belts 2 to be suspended simultaneously). The second rotary grindstone 4 is a finish grindstone that has the same number of V-formed protrusions on its periphery as the rough grindstone, and the grain size of the finish grindstone is finer than the first rotary grindstone.

Figure 5:
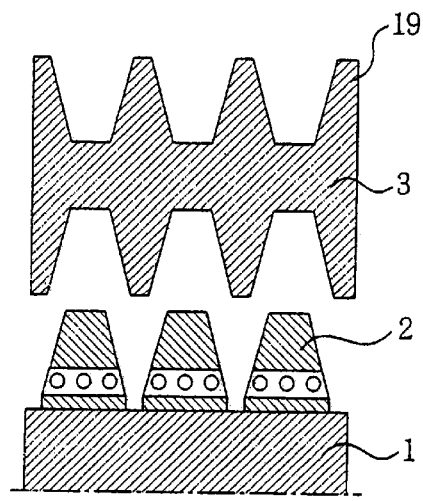
FIG. 5 is a partial enlarged view showing the relationship between the first rotary grindstone and ring-shaped belts being suspended on the main spindle roller.

FIG. 5 is a sectional view showing a state when ring-shaped belts 2 have been roughly ground by the first rotary grindstone 4 and the grindstone 4 has been moved away. In the embodiment shown in this figure, three ring-shaped belts 2 that have been almost roughly ground to V-section belts are suspended on the main spindle roller 1, and the first rotary grindstone 3, being an assembly of four grinding wheels whose peripheral section is a V-form 19, has been moved away.

Selection of the material and grain size of a rotary grindstone has significant effects on the finish accuracy, and many consideration have been made. In this embodiment, for the first rotary grindstone 3 (rough grindstone), a graphite carbon (GC) grindstone of grain size #30–#60 is used. As for its speed of rotation, the peripheral speed is set at 500–1500 m/min. For the second rotary grindstone 4 (finish grindstone), a GC grindstone of grain size #46–#80 is used. As for its speed of rotation, the peripheral speed is set at 500–1500 m/min. As for the combination of the grain size of the rough grindstone and the grain size of the finish grindstone, for example, combinations (the former/the latter) #30/#46 and #45/#80 are used. Normally, the difference between the former and the latter is 10 or more points. When a diamond grindstone or GC grindstone are used as rotary grinding wheels, the grinding cost per unit can be reduced to about 30 percent in comparison with the conventional grinding with milling cutters. Moreover, the finish (quality) is comparable to the conventional method. To use a diamond grindstone and GC grindstone properly, selection should be made by considering a fact that the latter has a high initial cost and a low running cost.

The method of producing raw edge belts 2 with this production apparatus is as follows: Plural square-cut ring-shaped belts 2 are suspended across the main spindle roller 1 and the tension roller 5, and the belts 2 are made to run circularly; the running belts 2 are roughly ground on the main spindle roller 1 by the rough grindstone (the first rotary grindstone 3) having V-forms in its peripheral section so that the section of the ring-shaped belts 2 becomes almost a V-form (grinding is made while the ring-shaped belts 2 circulate once or twice); and after that, the finish grindstone (the second rotary grindstone 4) is pressed against these roughly-ground ring-shaped belts 2 to polish and finish them while the ring-shaped belts circulate once or twice. As plural ring-shaped belts 2 can be ground and polished simultaneously, the efficiency is improved significantly in comparison with the conventional practice of grinding and polishing one belt at a time.

Another method of grinding the ring-shaped belts 2 is as follows: The speed of rotation of the main spindle roller 1 is set at a low speed, and the first rotary grindstone 3 is pressed hard against the ring-shaped belts 2 to cut the V-forms of the specified dimensions while the belts 2 make a single circulation; when the cutting comes to the position of the second rotary grindstone 4, the second rotary grindstone 4 is pressed against the ring-shaped belts 2; thus the grinding and polishing operations are completed while the ring-shaped belts 2 make one circulation+α circulation.

As is clear from the description up to the present, the method of producing raw edge belts and the production apparatus according to the present invention have the following excellent merits:

Meandering tends to occur when a broad vulcanized sleeve is made to run circularly. When the production method of the present invention is used, however, meandering will not occur as ring belts are suspended across both the rollers after square-cutting. Moreover, because of two-staged grinding with the first rotary grindstone and the secondary rotary grindstone, wherein high-efficiency grinding is given by the first rotary grindstone and high-accuracy grinding is given by the second rotary grindstone, grinding and polishing of ring-shaped belts to give a V-section is improved significantly both in terms of efficiency and quality.

With the use of the apparatus of the present invention, the production method of the present invention can be easily implemented.

When another embodiment of the apparatus of the present invention is used wherein the tension roller is provided with ribs, the plural separated square-cut belts can be suspended as one body. Hence grinding can be done with high efficiency and without any displacement or the like.

When another embodiment of the apparatus of the present invention is used wherein the rotary grindstones is a diamond grindstone or GC grindstone and their grain sizes are properly selected, the service life of the grindstones will be longer than that of the milling system, the number of grindstone replacements will be reduced, and thus the cost will be reduced. Moreover, the dimensional accuracy is higher.

While specific embodiments of the invention have been shown and described in detail to illustrate the inventive principles, it will be understood that the invention may be embodied otherwise without departing from such principles.

What is claimed is:

1. An apparatus for producing raw edge belts, the apparatus comprising:

a main spindle roller mounted horizontally and designed to hold square-cut ring-shaped belts, and a tension roller which is provided with ribs or flanges at its ends and with a required number of partition rings between the ribs and located beneath the main spindle roller, being parallel with said main spindle roller and installed so that it can be raised or lowered, a first rotary grindstone having a plural number of V-forms same as the number of the said belts in its peripheral section and capable of coming close to or moving away from said main spindle roller and being mounted on the upstream side of the direction of rotation of said main spindle roller, and a second rotary grindstone having a plural number of V-forms same as the number of the said belts in its peripheral section and capable of coming close to or moving away from said main spindle roller and being mounted on the downstream side of the direction of rotation of said main spindle roller.

2. An apparatus according to claim 1, wherein said tension roller is supported so that it can be raised or lowered via a shock absorbing spring.

3. A method of producing raw edge belts comprising placing plural square-cut ring-shaped belts across a main spindle roller and a tension roller, providing the tension roller with ribs or flanges at ends thereof and with a required number of partition rings between the ribs, rotating the tension roller, and simultaneously polishing the belts to have a substantially V-shaped section, the method further comprising the steps of:

grinding said ring-shaped belts on said main spindle roller into belts with a substantially V-shaped section using a first rough grindstone having V-forms in its peripheral section, and finish polishing said roughly-ground ring-shaped belts with a second finish grindstone having a plural number of V-forms same as the number of the said belts in its peripheral section.

\* \* \* \* \*